Oct. 16, 1928.

H. GOLDFINGER 1,687,663

APPARATUS FOR CUTTING FOWLS

Filed March 28, 1928

INVENTOR.
Hyman Goldfinger
BY Hoguet and Neary
ATTORNEYS.

Patented Oct. 16, 1928.

1,687,663

UNITED STATES PATENT OFFICE.

HYMAN GOLDFINGER, OF ASTORIA, NEW YORK, ASSIGNOR OF FIFTY ONE-HUNDREDTHS TO GUS LIPSCHUTZ, OF IRVINGTON, NEW JERSEY.

APPARATUS FOR CUTTING FOWLS.

Application filed March 28, 1928. Serial No. 265,350.

This invention relates to improvements in cutting apparatus and more particularly to improvements in apparatus for cutting a chicken or fowl.

Among the principal objects which the invention has in view are:

To provide an apparatus for cutting chicken or fowl in half; to provide an apparatus such that the chicken or fowl may be easily and conveniently disposed thereon and firmly maintained against movement during the cutting operation; to provide means for preventing slipping or displacement of the chicken or fowl in the apparatus while being cut; to simplify and improve the construction.

Other objects, features and advantages of the invention will appear as the description proceeds.

Reference is to be had to the accompanying drawings which show by way of illustration a preferred embodiment of the invention and wherein.

Figure 1:
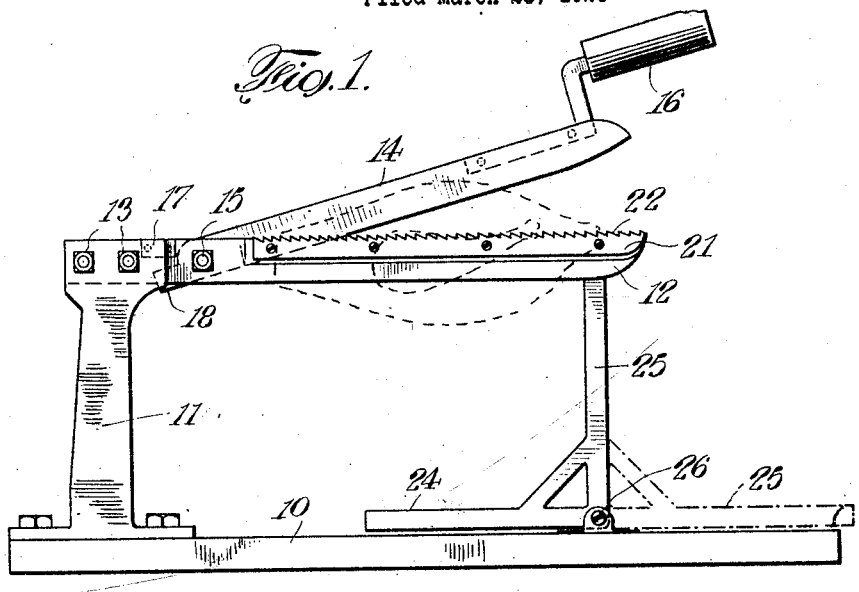
Figure 1 is a side elevation of a cutting apparatus constructed in accordance with the invention and showing the chicken or fowl disposed thereon and being cut.
Figure 2:
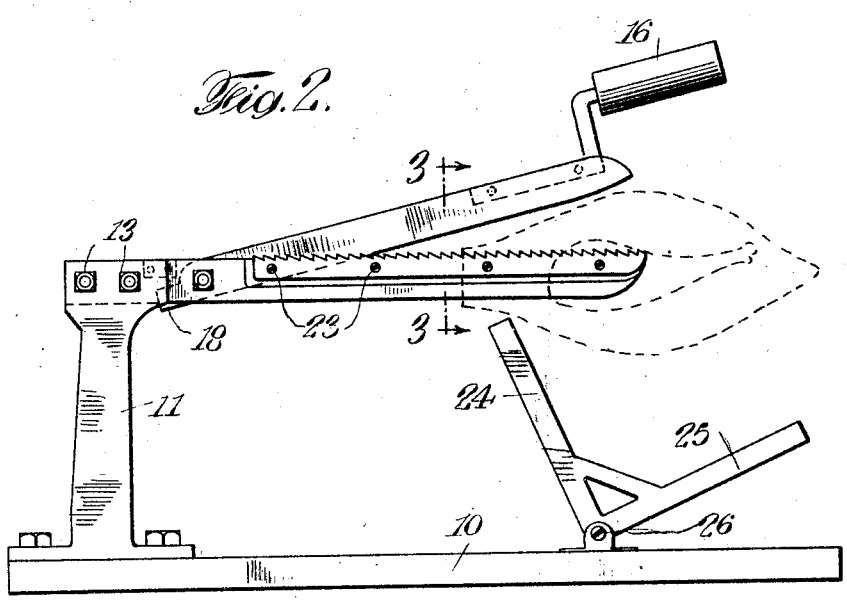
Figure 2 is a similar side elevation of the apparatus showing the manner of placing the chicken thereon.

Referring now more particularly to the drawings, which are to be considered merely as illustrative and to the details of which I do not intend to be confined, the invention is embodied in a cutting apparatus which comprises a base 10 having a standard 11 attached thereto and projecting vertically therefrom. The standard 11 carries a knife or blade 12 which is affixed to the top of the standard as by bolts 13 or similar fastening members and maintained securely in the horizontal position shown and supported during service by the standard. Another knife or blade 14 is pivoted to the knife or blade 12 as by means of a bolt 15 and is adapted to cooperate with the blade 12 for cutting any article placed thereon. The bolt 15 permits free pivotal movement of the blade 14 with respect to the blade 12 so that, in effect, the two blades form a shear or scissors. The free end of the blade 14 is provided with a handle portion by which the blade may be swung on its pivot and force applied thereto manually for cutting. A stop 17 may be placed on the rear end of the blade 12 and is adapted to cooperate with the rear arm 18 of the blade 14 to limit the movement of the blade 14.

Figure 3:
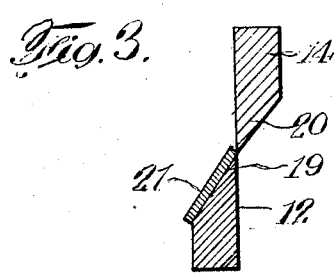
Figure 3 is a cross section taken as on the line 3—3 of Figure 2.

As best shown in Figure 3, the blades 12 and 14 terminate in inclined cutting edges 19 and 20 which cooperate with one another to slice or cut the chicken or fowl. On the inclined edge of the blade 12, I preferably place an element 21 having saw teeth 22 directed so as to prevent movement of the fowl or chicken outward on the blade 12. This element 21 may be fastened to the inclined surface of the cutting blade 12 in any suitable manner and preferably by set screws 23. The openings in the element 21, thru which the set screws pass, may be in the form of slots which will permit the element to be adjusted nicely on the blade 12 prior to being fastened rigidly thereon by the set screws.

I also provide means for supporting the free end of the stationary knife 12 so that said knife is not liable to break or rupture when the cutting force is applied. This means preferably takes the form of a bell crank lever having legs 24 and 25 extending at substantially right angles, the lever being pivoted to the base at 26 in any convenient manner.

When the cutting device is not in operation, and prior to the placement of a chicken or fowl thereon, the bell crank lever assumes a position such as indicated in dotted lines in Figure 1 with the arm 25 horizontal and the arm 24 vertical and supporting the free end of the knife 12. When it is desired to cut a roast chicken which has been cleaned out so that a hole extends completely thru the chicken, the chicken is placed upon the knife 12 by pushing the chicken on to the knife so that the knife goes thru the hole in the chicken. This operation of pushing the chicken on to the knife causes the bell crank lever to be tripped over by the action of the chicken on the arm 24 so that the bell crank lever automatically assumes another position in which the arm 24 is horizontal and the arm 25 is vertical to provide a supporting column beneath the free end of the knife 12. The chicken or fowl is now in place on the apparatus in a position to be operated on. The blade 14 is now forced downward by the application of force to the handle 16 and the chicken is cut in half. The chicken is prevented from moving or sliding outwardly on the knife 12 under the action of the cutting force by the provision of the saw teeth 22, which act to restrain it and to maintain it stationary during the cutting operation. After the chicken has been cut, it may be withdrawn and the bell crank lever assumes its first position with the arm 25 horizontal and the arm 24 vertical and beneath the free end of the knife 12. The provision of the bell crank lever is such as to always provide a support for the free end of the knife 12, while permitting a chicken or fowl to be conveniently slid on or taken off the knife 12.

Various changes and alteration in the exact construction herein described may be resorted to in the practice of the invention and I, therefore, desire to be limited only by the state of prior art and the scope of the appended claims.

I claim as my invention:—

1. An apparatus for cutting a fowl or the like comprising a stationary knife rigidly held in horizontal position at one end, a cooperating knife pivotally attached to the first knife near its fixed end, and means providing a support for the free end of the stationary knife while permitting the fowl to be slid on said knife.

2. An apparatus for cutting a fowl or the like comprising a stationary knife, rigidly held at one end in a horizontal position, a cooperating knife pivotally associated with the stationary knife near the fixed end thereof, a fowl being adapted to be slid on the stationary knife at the free end thereof, and means for maintaining the fowl stationary on said knife during the cutting operation.

3. An apparatus for cutting a fowl or the like comprising a stationary knife maintained in a horizontal position, and rigidly supported at one end, a cooperating movable knife, the fowl being adapted to be slid on the stationary knife at the free end thereof, and means for supporting the free end during the cutting operation and permitting the fowl to be slid thereon.

4. An apparatus for cutting a fowl or the like comprising a stationary knife maintained in a horizontal position, and rigidly supported at one end, a cooperating movable knife, the fowl being adapted to be slid on the stationary knife at the free end thereof, and means for supporting the free end during the cutting operation and permitting the fowl to be slid thereon, said means comprising a supporting member for engaging beneath the free end of the stationary knife and movably mounted so as to be automatically moved out of the path of the fowl as the latter is being slid on the stationary knife.

5. An apparatus for cutting a fowl or the like comprising a stationary knife rigidly supported at one end in a horizontal position, a cooperating knife movable relatively to the stationary knife, the fowl being adapted to be slid on the stationary knife at the free end thereof, a bell crank lever pivotally mounted and having two legs extending substantially perpendicular relative to each other, each of said legs being adapted to assume a vertical position to form a supporting column beneath the free end of the stationary knife.

In testimony whereof, I have signed my name to this specification this 26th day of March, 1928.

HYMAN GOLDFINGER.